Figure 1:
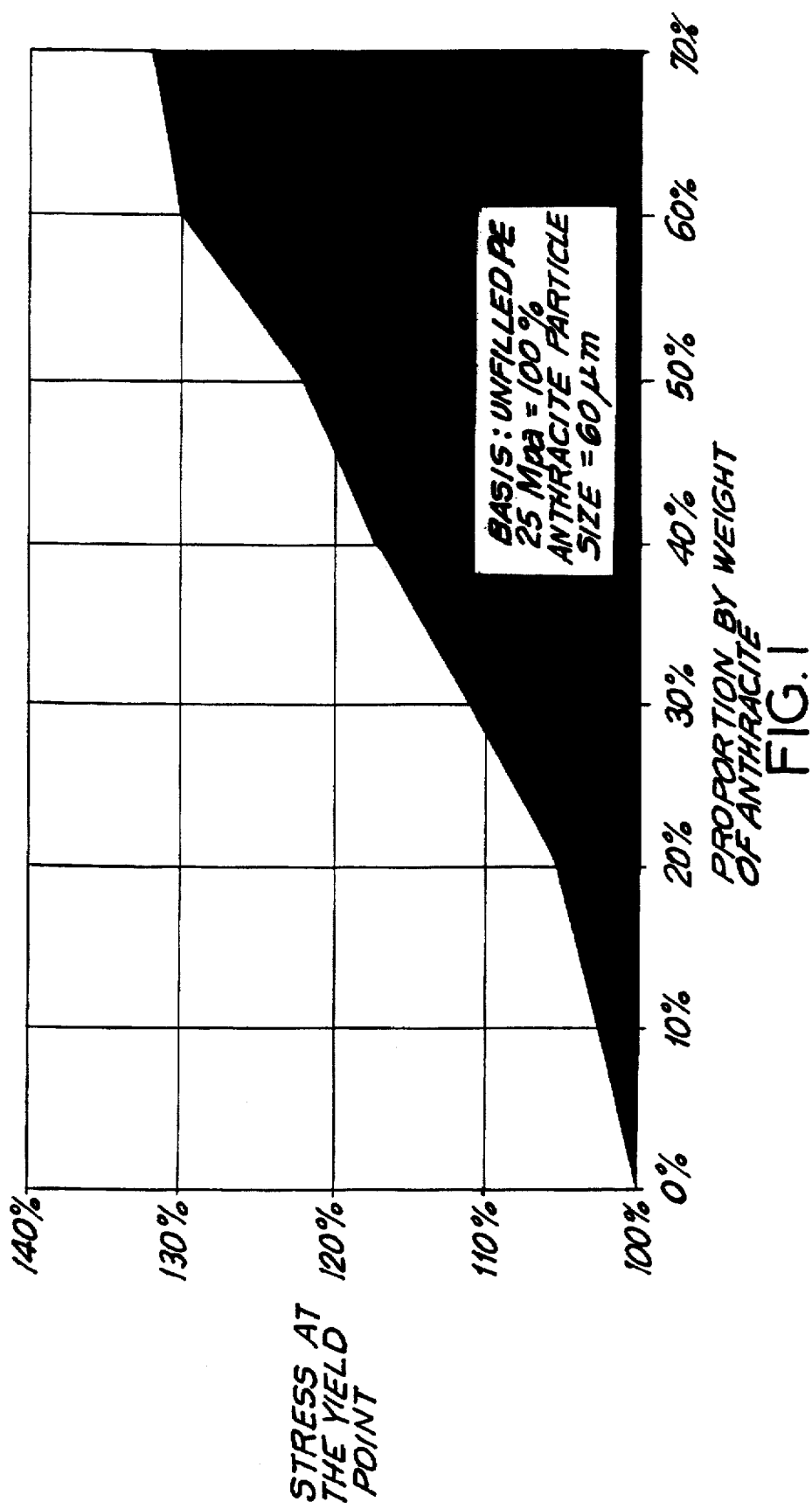

United States Patent [19]

Nickel

[11] Patent Number: 5,726,238
[45] Date of Patent: Mar. 10, 1998

[54] MATERIAL COMPOSED OF CARBON COMPOUNDS

[75] Inventor: Klaus-Dietrich Nickel, Frankfurt am Main, Germany

[73] Assignee: Citadel Investments Limited, St. Helier, United Kingdom

[21] Appl. No.: 622,049

[22] Filed: Mar. 26, 1996

Related U.S. Application Data

[63] Continuation of Ser. No. 380,224, Jan. 27, 1995, abandoned, which is a continuation-in-part of Ser. No. 94,195, filed as PCT/EP92/02724, Nov. 26, 1992, published as WO93/12169, Jun. 24, 1993, abandoned.

[30] Foreign Application Priority Data

Dec. 4, 1991 [DE] Germany .................. 41 40 025.9

[51] Int. Cl.$^6$ ................................. C08K 3/04
[52] U.S. Cl. ................ 524/496; 524/495; 523/215; 523/351
[58] Field of Search ................... 524/495, 496; 523/215, 351

[56] References Cited

U.S. PATENT DOCUMENTS

| | | | |
|---|---|---|---|
| 3,915,906 | 10/1975 | Romey | 524/525 |
| 4,205,035 | 5/1980 | Kroger et al. | 524/59 |
| 4,592,963 | 6/1986 | Mukasa et al. | 428/544 |
| 4,671,907 | 6/1987 | Iwahashi et al. | 423/445 R |
| 5,096,633 | 3/1992 | Yoshida | 524/496 |
| 5,212,226 | 5/1993 | Soeda et al. | 524/495 |

*Primary Examiner*—Vasu Jagannathan
*Assistant Examiner*—Olga Asinovsky
*Attorney, Agent, or Firm*—Anderson Kill & Olick, P.C.

[57] ABSTRACT

A material composed of carbon compounds may be shaped into high-quality moulded bodies, foils, plates, pipes or the like by all usual plastics processing machines, and may further be reused several times with no perceptible loss of quality. Above all, it may be disposed of by incineration with a high calorific value without fouling the incineration plants or polluting the atmosphere with toxic, harmful substances in an inadmissible manner.

11 Claims, 7 Drawing Sheets

MATERIAL COMPOSED OF CARBON COMPOUNDS

This is a continuation application of Ser. No. 08/380,224, filed Jan. 27, 1995 now abandoned, which in turn is a continuation-in-part application of Ser. No. 08/094,195, filed as PCT/EP92/02724, Nov. 26, 1992, published as WO93/12169, Jun. 24, 1993, now abandoned.

The invention relates to a material composed of carbon compounds and processable with all known plastic processing machines to molded articles, plates, panels, pipes, sheets, films etc..

Aside from the numerous, different, pure plastics, such as polyvinyl chloride, polyethylene (low and high density), polypropylene, polystyrene, nylons, etc., plastic-filler combinations have, in part, also for reasons of costs, achieved special importance in the market. To cover special market requirements, combinations of very fine-grained carbon powders, coke powders and oil coke powders, embedded in a matrix of thermoplastic polymers, have become known. In some cases, the very fine-grained powders of carbon, coke or oil coke were not regarded in the usual sense as filler, but more or less also as an integral component of the thermoplastic polymers, which has a decisive effect on the properties of this plastic.

A method for the production of plastically deformable compositions of polyethylene and finely powdered fillers of coke, have also become known. In said compositions, the polyethylene matrix is admixed with at least one fourth of its weight, but preferably with the same amount or more of finely powdered cokes in a known manner (German Auslegeschrift 1 056 607).

In the plastically deformable compositions, the carbon or coke powders did not have the material-deteriorating properties of the fillers mostly used. Instead, they surprisingly led to improved physical properties of the molding compound (improved tensile strength, bending tensile strength, stress-strain and resistance to becoming brittle); the molding compounds could be molded readily. Coke from bituminous coal, oil or pitch proved to be particularly suitable for filling the polyethylene matrix. Good elastic panels could be molded particularly from equal parts of low-ash bituminous coal coke and polyethylene. In contrast to filling the polyethylene matrix with other fillers such as slate flour, these panels showed good stability in the bending test. At the same mixing ratio of slate flour to polyethylene, the panels broke after only a few bending stresses.

In the known method, the coke powders are prepared by grinding in the usual manner. Not only very fine powders (6,400 mesh cm$^2$), but also powders with a coarser structure (900 mesh cm$^2$) can be used for high-grade molding compounds.

Cross-linking agents, lubricants and other known additives, such as UV stabilizers, heat stabilizers, etc. can also be added to the mixtures of polyethylenes and coke powders.

The good fusability of the molded articles produced from the known molding compounds is particularly emphasized.

Molding compounds containing finely divided coke with a diameter of less than 60 μm have also become known. The compounds consist of polyethylene, polypropylene, polybutylene, ethylenepropylene, ethylene-butylene or propylene-butylene in copolymers and, for 100 parts of polymer, contain 200 to 400 parts of finely divided petroleum coke, at least 80% of which has an average particle size between 0.75 and 50 μm (German Auslegeschrift 1,259, 095). These molding compounds are based on the realization that the size distribution of the petroleum coke particles is critical for achieving structural strengths in the end product. It was practically impossible to add more than 150 to 200 parts of petroleum coke particles, the diameter of which on the average was more than 50 μm, to such polymers (!!). In addition, these products did not have the necessary high impact-tension and bending strength. In a surprising manner, it turned out that, if petroleum coke is comminuted and particles with a particle size between 0.75 and 50 μm are mixed with the polymers, very advantageous physical properties were achieved.

Any conventional, commercial polyolefin or copolyolefins with a melt coefficient between about 10 and 0.2 and a molecular weight between about 50,000 and 700,000 can be used for the production of the known molding compositions.

The comminution and calibration of the petroleum coke before it is used in the known molding compositions can be attained by grinding in a ball mill, rod mill, hammer mill, by tossing the coke particles by blowing with steam or air against a surface, by the centrifugal action of rotor wings (Pallmann pulverizing apparatus), by ultrasound oscillations or by the use of steel rollers lying opposite one another at a distance of 0.0254 cm or less.

Since the hardness of oil coke, particularly if the ash content is relatively high, can be appreciable, for example, 7.5 to 8 on the Moh's hardness scale, a comminution of the oil coke of one of the aforementioned types leads to rapid wear of the comminuting equipment and consequently to metal, iron or steel residues in the milled material, which either must be removed laboriously and cost intensively or leads to properties of the molding compounds, which are not acceptable in all areas of application.

A method has also become known for producing specially ground carbons as fillers for plastics. For this method a bituminous coal, such as anthracite, is comminuted in a nonoxidizing atmosphere in such a manner, that the average particles sizes are not more than 2.5 μm and so that, in particular, the particle size distribution is such, that at least 90% of the particles are smaller than 5 μm (German Offenlegungschrift 1 592 914).

These known forms of carbon are generally obtained by comminuting or grinding conventional carbons, preferably in autogenous comminuting mills. In particular, mills working with flow agents, which are generally known under the name of "hurricane mills" are used. These mills contain no air or no free oxygen during the comminution, as otherwise the flow agent would have a disadvantageous effect on the ground carbons, which are used, for example, in rubber and other polymers. The nonoxidizing atmosphere for the known milling of carbons is necessary because, during the disintegration of coke, particles of very high reactivity are formed, possibly because of the rupturing of bonds. This can occur during the grinding with the consequence, that such ruptured bonds react with oxygen from the air and thereby lose their reactivity. If, however, sufficient protection is provided for the ruptured bonds, these bonds can react with other components of the polymers and lead to polymers or rubbers with physical properties, which are excellent.

The effect of oxygen is prevented during comminution by an inert gas atmosphere and during classifying, on the other hand, by spraying the particles with about 0.1 to 1% zinc stearate, based on the weight of the product. The particles are coated individually with zinc stearate, until a relatively uniform coating is obtained. The coating melts, when the coke powder, so protected, is added to the natural rubber, vulcanizing it.

Aside from being used as an additive for natural rubber, the coke, prepared by the known method, can also be used as a filler for conventional plastics.

Further methods for the preparation of coke mixtures, such as that of the German Offenlegungsschrift 1 719 517, have become known. These methods result in a high surface enlargement of the milled particles, which are used for admixing with plastic. Plastics for the manufacture of pipes, panels, plates, disks and other molded objects by extrusion and injection molding, in which the plastic, due to the admixture of electrically conducting carbon materials, has antistatic properties (German Offenlegungsschrift 2 017 410), as well as modified plastics, which contain oleophilic graphite, which is prepared by grinding a natural or synthetic graphite in an organic liquid with the exclusion of air.

All of these materials have the disadvantage that the preparation of the carbon or the coke is expensive, as a result of which the price per unit weight of the finished material increases to such an extent, that with all advantages, which these material have, their use has remained within narrow limits because of the costs.

The more or less slightly developed ability of these plastics or plastic-filler combinations to be recycled is a further disability. Rather, with the previously known plastic-filler combinations, there are usually appreciable losses in quality, with the consequence that already recycled plastics can frequently be used further only in conjunction with primary plastics or, if not mixed with these, can be used only for the manufacture of inferior molded articles.

In addition, considerable problems arise out of the fact that such materials can be eliminated and, particularly, disposed of only at great expense, if at all. The materials hardly decompose, for example, in garbage dumps and evolve pollutants in the waste gases when combusted. These disadvantages become all the more important, because the use of plastics is increasing steadily. For example, in the year 1990, far in excess of 9 million tons of plastics were processed in the Federal Republic of Germany alone, without taking into consideration the newly additional East German states, but including the chemical fiber. At the official growth rate of 8% per year of the plastic market, the consumption of plastic would grow in the area of the former Federal Republic of Germany to 19 million tons per year by the year 2000. This alone could confront the realization, for example, of the targets of the Packaging Regulation adopted by the Government, with insoluble tasks already in 1996, since the disposal of scrap plastics from industry and households is unsolved until now and the recycling rate in West Germany is only about 7%. As against this, the recycling rates of aluminum, paper and glass are 38.3%, 40.7% and 43.2% respectively. If plastics, which are not biologically degradable, would simply be deposited on garbage dumps, dumps would result which, in the long run, would have an uncertain fate and, as a result of material conversion, would emit into the air and water.

Burning most plastics, for example, in garbage incinerators, would also create appreciable difficulties because the installations would be burdened by large amounts of ash due to the fillers and the flue gases would be contaminated by toxic dioxins or other material formed during the combustion. Such toxicologically critical groups of materials are released during the combustion when the temperature passes through regions between 250° C. and 400° C. and reach the atmosphere in this way in the vicinity of the earth by way of the flue gas. Because of such fears, it is politically impossible to construct special garbage incinerators for toxic waste at the present time.

Particularly cost intensive is the sorting by type of packaging materials and plastic household objects, such as ballpoint pens, films, sheets, containers, canisters, toys and synthetic textiles from mixed household garbage. All of these plastics consist of primary materials or secondary materials, that is, those plastics, which have already been recycled at least once. Because of exposure to heat and radiation, as well as due to the melting and regranulation in the recycling process, these plastics show appreciable losses in quality compared to primary plastics. If, as a result of deficient separating possibilities, plastics are not recycled by type (polyethylene, polypropylene, polystyrene, polycarbonate, polyester, nylon, etc.) or primary plastics and secondary plastics are recycled together or if plastics, particularly in their first use, contain pigments, stabilizers, plasticizers or other additives, there are additional quality losses, which prevent reuse of such plastics for economic reasons. Therefore only a small portion of plastics turning up are recycled. Recycling without loss in quality worth mentioning results only if the plastics in question are recycled by type. However, even these pure-type plastics differ largely depending on the type of filler or pigment used, so that, for this reason, quality losses are unavoidable.

Even with the support of the "dual system", which is being built up, for example, in Germany, it will be difficult, in the future, to lay hold of even only 8 to 10% of the total primary plastics production largely in pure form (such as polyethylene), a further 10 to 13% largely of similar types and about 10% mixed and impure.

Because of their necessarily reduced quality, their deficient design and finish and because of their excessively high price, recycled plastics do not find the necessary market acceptance. In addition, there are legal standards and DIN regulations, which greatly limit the use of secondary plastics.

On the basis of all of the above, it can be assumed that the high costs of collecting, separating, working up, granulating and transporting, as well as the new selling costs will limit the recycling of plastics to a minimum.

In addition, as a result of the obligation of the manufacturer or the merchant to take back the plastic products that have served their purpose, the market prices for primary plastics will rise between 25 and 30%, in order to cover the considerable charges arising from collecting and classifying and the costs, which result therefrom for the disposal of these materials.

The previous way of recycling plastics will result sooner or later in a mountain of former recycled plastics, which can no longer be recycled and are also no longer usable for thermal destruction.

As against this, the object of the invention is to provide materials, which can be produced inexpensively and can be processed on almost all plastics processing machines and installations, are composed of carbon compounds, which not only have good mechanical, physical and processing properties comparable with the properties of known materials composed of carbon compounds, but also, in addition, can be reused without devaluating quality losses and disposed of without problems and without contaminating the environment.

It has now been found that this objective can be accomplished simply owing to the fact that the carbon compounds, aside from low-polluting and low-ash bituminous coal, bituminous coal coke or oil coke, which has been disintegrated at very high impact speeds to very fine carbon powders, also contain thermoplastic polymers of the hydrocarbon group, which are combined in a chemically stable manner with the very fine particles of the carbon powder, due to the bonding energy released by the high-speed impact comminution in the closed system of material processing installations, without further additives to a material, which can be recycled repeatedly without any devaluating loss in quality and with a calorific value of more than 37,500 kJ/kg.

With the invention, it is possible to furnish solid fuels, such as carbon in the form of coke, coal, bituminous coal, oil coke and particularly anthracite, before they are used as thermal energy (combustion) for numerous novel and different possible uses, provided that these fuels contain little in the way of pollutants and ash and have been processed at very high impact speeds to very finely grained carbon powders. It was found that these very fine particles of the carbon powders, during their high-speed impact comminution in a closed system of material processing plants, release bonding energies, as a result of which they bond in a chemically stable manner without further additives to thermoplastic polymers to form materials. These materials and the products manufactured from them have physical and technological properties, which are appreciably improved over those of previously used polymers. The surprising thing is, however, that these new materials can be recycled repeatedly without devaluating losses in quality and finally converted with a high calorific value by combustion into thermal energy without burdening the combustion chambers or the flue gases resulting from the combustion with pollutants beyond the permissible measure. The new materials being cycled represent an environmentally friendly, appreciable energy reserve.

Thanks to the invention, the conversion of this energy reserve into thermal energy can still take place, even after repeated recycling, in an environmentally friendly and almost cost-neutral manner, without resorting to garbage dumps or garbage incinerators.

Basically, the fuels can be comminuted in comminuting installations suitable for high-speed impact comminution. It has, however, turned out that a particularly advantageous and, above all, economic and inexpensive comminution is achieved in turbulent flow disintegrators of the German patent 38 02 260 D2. Such turbulent flow disintegrators operate with countercurrently rotating, radially consecutive blade rings in such a manner, that zones of turbulence are formed in the annular spaces between the blade rings. The fuel particles strike one another at high speed in these zones of turbulence without any interfering metal abrasion taking place. As it passes through the radially consecutive zones of turbulence, each fuel particle, on the average, experiences eight collisions with other particles. Impact velocities close to the velocity of sound occur particularly in the last turbulence zone between the last but one and the outermost blade rings, but also beyond this zone.

The comminuting time within a turbulent flow disintegrator has been measured to be 0.5 seconds. Compared to the comminuting time of fuels, for example, in a ball mill or in other comminuting equipment, this time is exceptionally short. As a result, not only is the comminution more inexpensive than in other mills, but there is also a significant chemical engineering advantage, since the bond energies released (predominantly ions or electrons) cannot be dissipated so quickly over the metal construction of the preparation installation into the ground.

The material comminution in a turbulent flow disintegrator of the aforementioned type thus has a further, significant advantage over other types of comminution. As a result of the high impact velocities during the comminution and particularly because the fuel particles impact on one another and are not flung by centrifugal forces against a wall or the like and are not consolidated at the surface by the balls in a ball mill, high bond energies are released and largely maintained. When the fuel particles are brought together with the hydrocarbon of the polymers in the extruder, these bond energies are available almost completely for improving the quality of the inventive materials. Contrary to the situation in the case of comminution by shearing or tearing as disclosed, for example, in the German Offenlegungsschrift 1 592 914, the weakest bond energies disintegrate first in the high-speed impact comminution described. Only the weakest bond energies of the fuel particles are released during the high-speed impact comminution described, so that the fuel disintegrates into many stable microparticles. What is thus formed as a micropowder has strong bonding quality in its particles and enters into chemical bonds with the respective polymer, which lead to the outstanding properties of the new material.

The high-speed impact comminution supplies excitation energy for the hydrogen ions/electrons and the carbon electrons, which thus can have free orbitals and also a higher energy level. This process is temperature dependent. Pursuant to the invention therefore, the high-speed impact comminution and also the mixing of the activated carbon powder with the polymers is carried out in the extruder while supplying heat and partly in an inert gas atmosphere, in order to prevent interaction between the bond energies released and the oxygen of the air. In addition, by supplying heat, the reactivity of the carbon powders is increased before and in the extruder. It was found that the best processing temperature of the carbon powders with the polymers to a bonded material in the extruder lies between 240° and 300° C. If this temperature is lowered greatly, the high-grade material properties of the new materials, including the good electrical conductivity, are not attained.

The above-described preparation method with high-speed impact comminution at almost the speed of sound leads in the case of anthracite to a surface change with formation of pores less than 3.6 μm in diameter in the particle structure, with the result that the surface area of the particles is greater by a factor of more than 10 than that of anthracite prepared in ball mills or vibration grinding mills (particle size screened off at 40 μm). The surface area at high-speed impact comminution was 28 $m^2/g$ instead of 2.6 $m^2/g$ and 2.8 $m^2/g$ for preparations with the ball mill or the vibration grinding mill. The pores are formed owing to the fact that, during the high-speed impact comminution near the sound barrier, temperatures up to about 300° C. result briefly during the impact processes and, as a result, volatile components of the anthracite are set free. Particular attention must therefore be paid to ensuring that these micropores make the anthracite hygroscopic (with a water absorption up to 6%, partly also from the surrounding air). The ability of liquids to penetrate into these micropores and to entrench themselves there is due to the molecular structure of the respective liquid. $H^+$ ions or at least $H^+$ dipoles occupy appropriate places in the pores, so that $OH^-$ ions or $OH^-$ dipoles can no longer be adsorbed there (this process is time dependent). A change in the storage time of the anthracite before it is processed further in the extruder correspondingly reduces the absorbability of molecules with an $OH^-$ group. This process plays an important role in bringing together carbon powders, preferably anthracite powder, with the polymers by extrusion and must therefore be taken into consideration.

From the "preference" of, for example, the disintegrated anthracite for $H^+$ ions, which can be demonstrated by absorption experiments with water or phenol, it can be concluded that, in the case of the inventive material, the hydrogen of the —$CH_2$—$CH_2$— chains of the polymer combines chemically with the carbon chains of the anthracite —C—C—C—.

Pursuant to the invention, polyethylenes or polypropylenes, which are as pure as possible are used as polymers. They are melted at 240° to 300° C., for example, in a double-screw extruder with screws rotating in the same direction. The prepared carbon powders, preferably the very finely particulate, disintegrated anthracite heated to 200° to 300° C., is metered continuously into the melt. The anthracite proportion varies from granulate type to granulate type between 40–80M %. The resulting extrudate is granulated, so that it remains storable without reduction in quality and can be processed on practically all known plastic processing machines or installations into marketable products (such as molded articles, plates, panels, pipes, sheets, films and, because of its resistance to chemicals and UV, also into containers, tanks, vats and canisters for disposing of chemical waste and hazardous waste).

Anthracite, with approximately the following analytical values and low in ash and sulfur, is particular suitable as carbon powder prepared in finely particulate form:

| Carbon Content | above | 94% |
| Ash Content | below | 3.5% |
| Sulfur Content | below | 1.5% |
| Volatile Components | below | 2.5% |
| Calorific Value | above | 35,500 kJ/kg |

This material consists to the extent of 70% by weight of powdered anthracite and 30% by weight of polyethylene.

Pursuant to the invention, this anthracite powder, prepared in finely particulate form, combines chemically with the polyethylene to form a new material. In comparison with polyethylene, the new material has the following performance values:

| Value | DIN | Polyethylene | New Material (Standard Type) |
| --- | --- | --- | --- |
| Tensile Strength | 53 455 | 25 N/mm$^2$ | 35 N/mm$^2$ |
| Stress-strain | 53 455 | 6% | 2% |
| Bending Strength | 53 452 | 18 N/mm$^2$ | 44 N/mm$^2$ |
| Modulus of Elasticity | 53 457 | 840 N/mm$^2$ | 2460 N/mm$^2$ |
| Impact Strength | 53 453 | without breakage | without breakage |
| Softening Temperature | ISO 306 Vicat | 78° C. | 107° C. |
| Electrical Conductivity | | $2 \times 10^{14}$ Ω | $1 \times 10^6$ Ω |
| Cold Impact Strength | | without breakage | without breakage |

Further data and comparisons can be taken from the graphical representations.

These performance data are better than the performance data of most materials, which have become known through the state of the art. In weathering tests, the tensile strength of the new material does not decrease as much as it does in the case of pure polyethylene. The impact strength is fully retained even after 500 hours.

Pursuant to the invention, the very finely particulate carbon powders are disintegrated and screened to particle sizes between 10 μm and 90 μm, depending on the use to which the material is to be put. They constitute 20 to 70% by weight of the new material, the difference from 100% by weight consisting of polymers.

Particularly important is the fact that the calorific value of the new material lies above that of conventional fuels, as is shown by the following table:

| Material | Calorific Value |
| --- | --- |
| Bituminous coal | 21–33 kJ/g |
| Natural Gas | 37 kJ/g |
| New Material | up to 38.5 kJ/g (depending on the proportion by weight of the polymers) |

Consequently, the new material can be disposed of without difficulties, even after repeated recyclings, by combustion in power plants, cement plants, lime plants, etc. or in garbage incinerators for obtaining environment-friendly thermal energy. Previously, it was necessary to pay an amount of up to DM 400.00 per ton for burning plastics in special garbage incinerators. In contrast to this, payment of the high calorific value can be made to the supplier of power plants, cement plants, lime plants, etc. !Because of the high carbon content of more than 90%, such material waste is also of interest to the steel industry for improving steel qualities! There is no contamination of the furnace installations and no burdening of the flue gases with pollutants beyond the permissible amounts.

Processable special qualities of material granulates or material powders with high strength, high temperature resistance and high electrical conductivity result when the materials are prepared in an inert gas atmosphere in a system, which is completely closed off from the surrounding air or in an inert gas atmosphere with a residual oxygen content of up to 3% and, until they are processed further, are stored in a gas-tight container out of contact with the air.

Low-polluting disposal is achieved owing to the fact that the thermoplastic polymers added contain, as additives, stabilizers, electrical conductors or pigments, only those materials which, upon combustion of the material or of the products produced therefrom, do not burden the flue gas with substances with toxic activity or with pollutants beyond the permissible extent.

It has now been found that a material, which consists, for example, of 70% by weight of powdered anthracite and 30% by weight of polyethylene, is not attacked by chemical reagents and is resistant to UV at normal environmental temperatures up to 37° C. (test time of 2000 hours, anthracite powder with an upper particle limit of 60 μm).

By cross-linking the inventive material with an electron accelerator, the strength and thermal load-carrying ability of the products produced therefrom are increased appreciably further (for example, in the case of pipes, containers, vats, molded articles, etc.). The thermoplastic properties, however, decrease with the increasing degree of cross-linking. Extensively cross-linked materials are no longer suitable for recycling, but do not lose their important advantages for an environmentally friendly disposal as a low polluting fuel with a high calorific value.

Important properties of the new materials are described in the following by means of graphic representations, taking parameters into consideration.

FIG. 1 shows how the tensile strength (=stress at the yield point) of the inventive materials as the proportion of anthracite with a particle size of 60 μm increases. Pure polyethylene (PE) serves as a comparison basis with 100%. The analytical values of the anthracite correspond to those, which are characterized in claim 2. As the particle size of the anthracite powder becomes smaller, the tensile strength increases only slightly.

Figure 2:
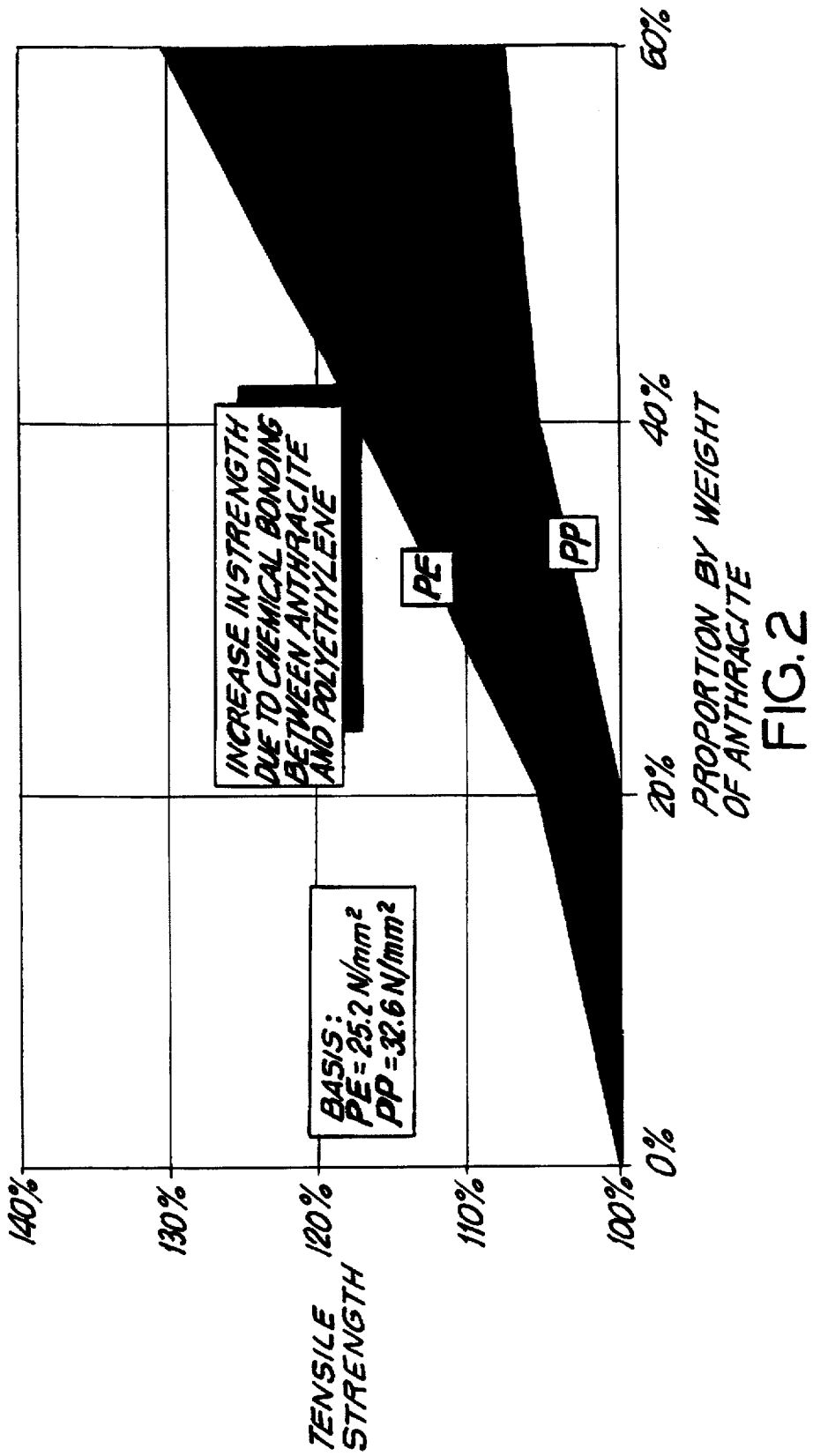

FIG. 2 shows the increase in strength of the new materials as a function of the proportion by weight of anthracite.

Pure polyethylene with 25.2N/mm² and pure polypropylene with 32.5N/mm² serve as a basis. The anthracite once again has a particle size of 60 μm. It is interesting that a material with polyethylene as a polymer component has a clearly higher tensile strength than a material that contains polypropylene as polymer component. Evidently, the anthracite prepared pursuant to the invention reacts more stably with polyethylene than with polypropylene. In the case of both materials, the tensile strength increases differently with increasing anthracite contents.

Figure 3:
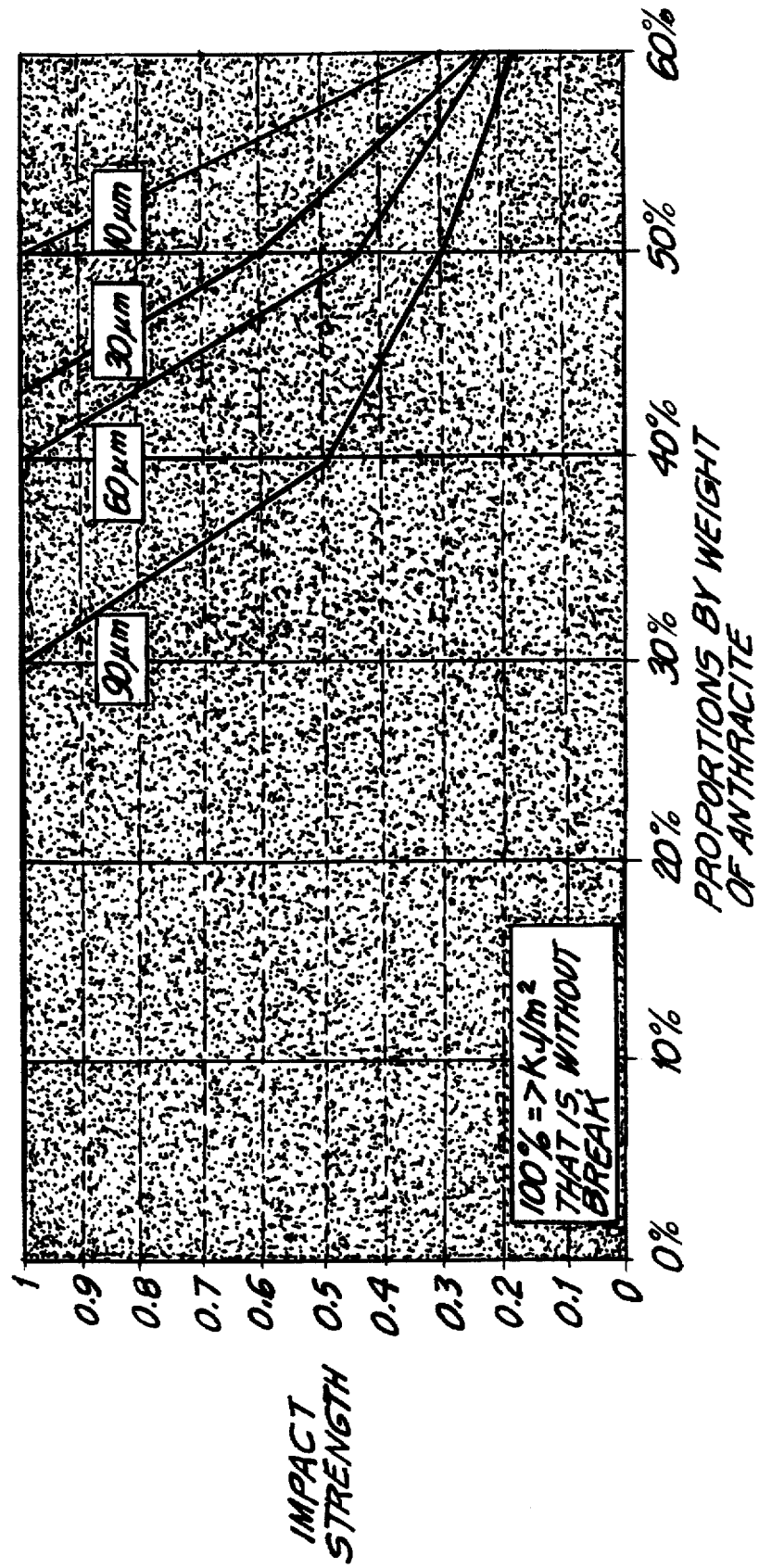

FIG. 3 shows the impact strength of the new materials as function of different degrees of fineness of the anthracite in the material. Basically, if the particle size of the anthracite powder is 90 μm, the impact strength is fully maintained up to an anthracite content of 30% by weight. As the anthracite content increases, the impact strength decreases and reaches a lower value of 20% at an anthracite content of 60% by weight. The materials, in which the anthracite powder has particle sizes of 60 μm, 30 μm and 10 μm behave similarly. If the impact strength of new material with a high anthracite content is important, it is advisable to select smaller particle sizes.

Figure 4:
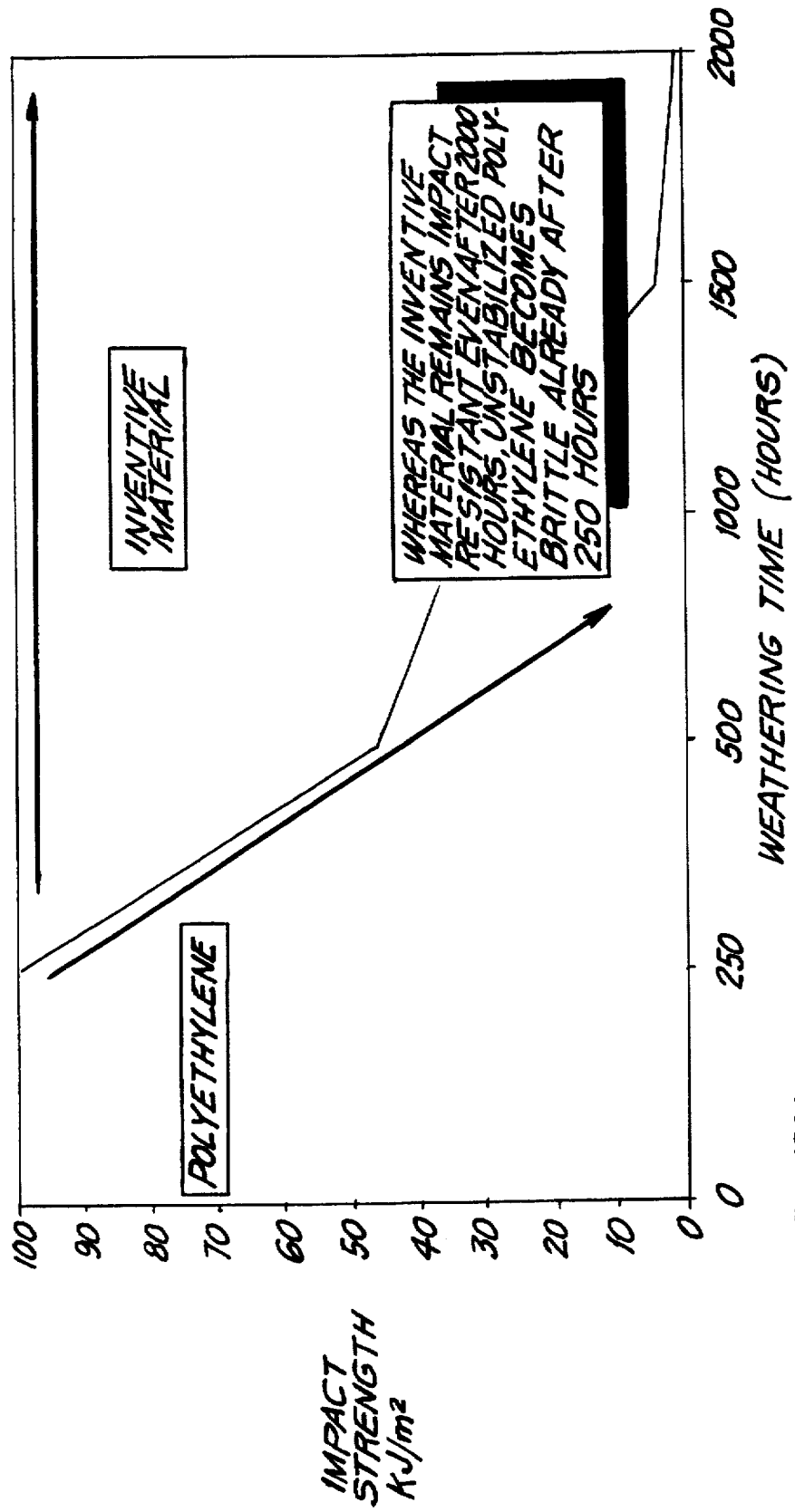

According to FIG. 4, the impact strength of the inventive materials is not changed by weathering. On the other hand, polyethylene becomes brittle already after 250 hours. In industry, this disadvantage of polyethylene usually is compensated for by the addition of stabilizers. The inventive material makes do without these additives.

Figure 5:
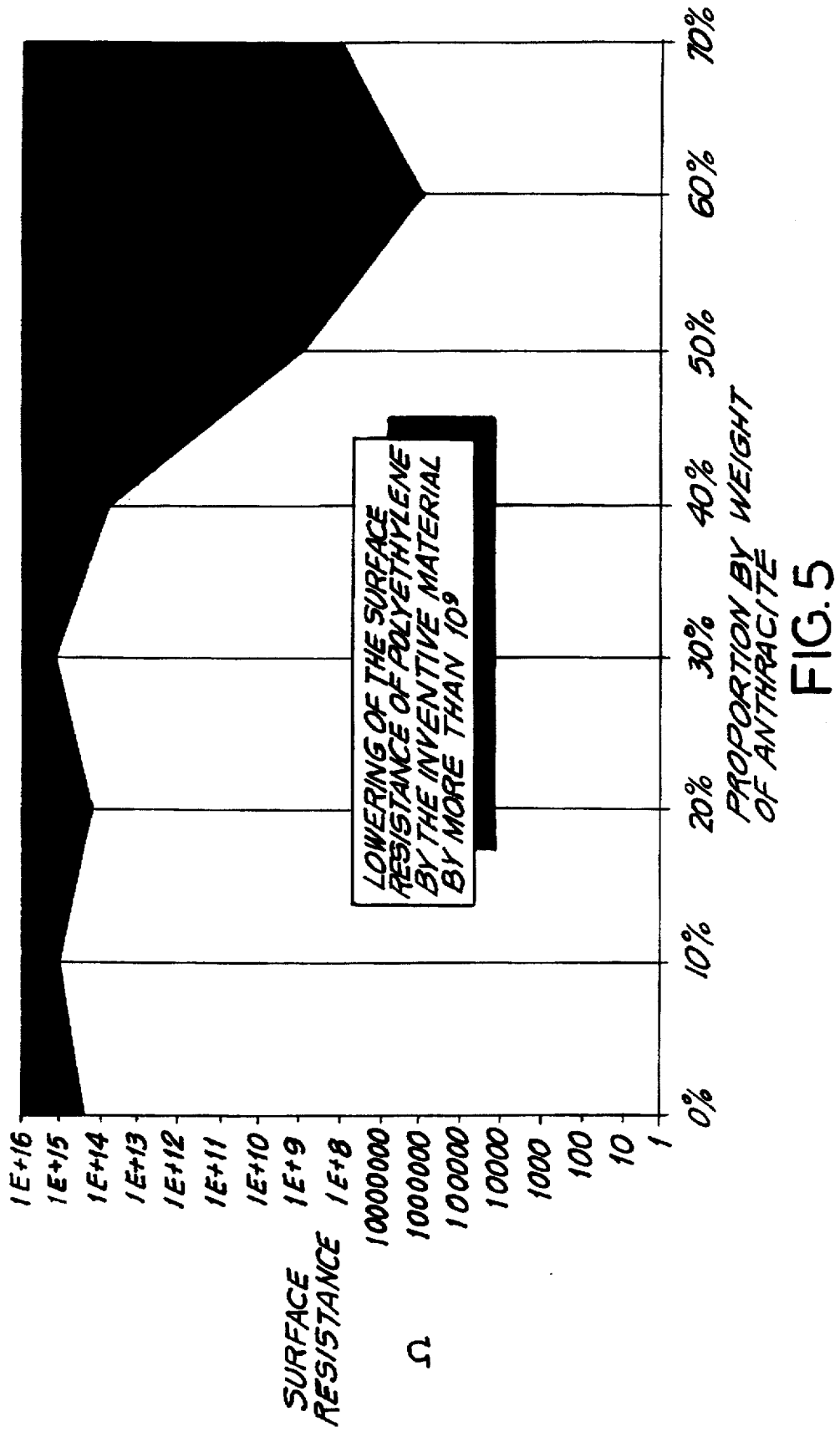

According to FIG. 5, the proportion by weight of anthracite also has an effect on the electrical conductivity, which reaches a maximum at 60% by weight of anthracite (this corresponds to a minimum in the surface resistance).

Figure 6:
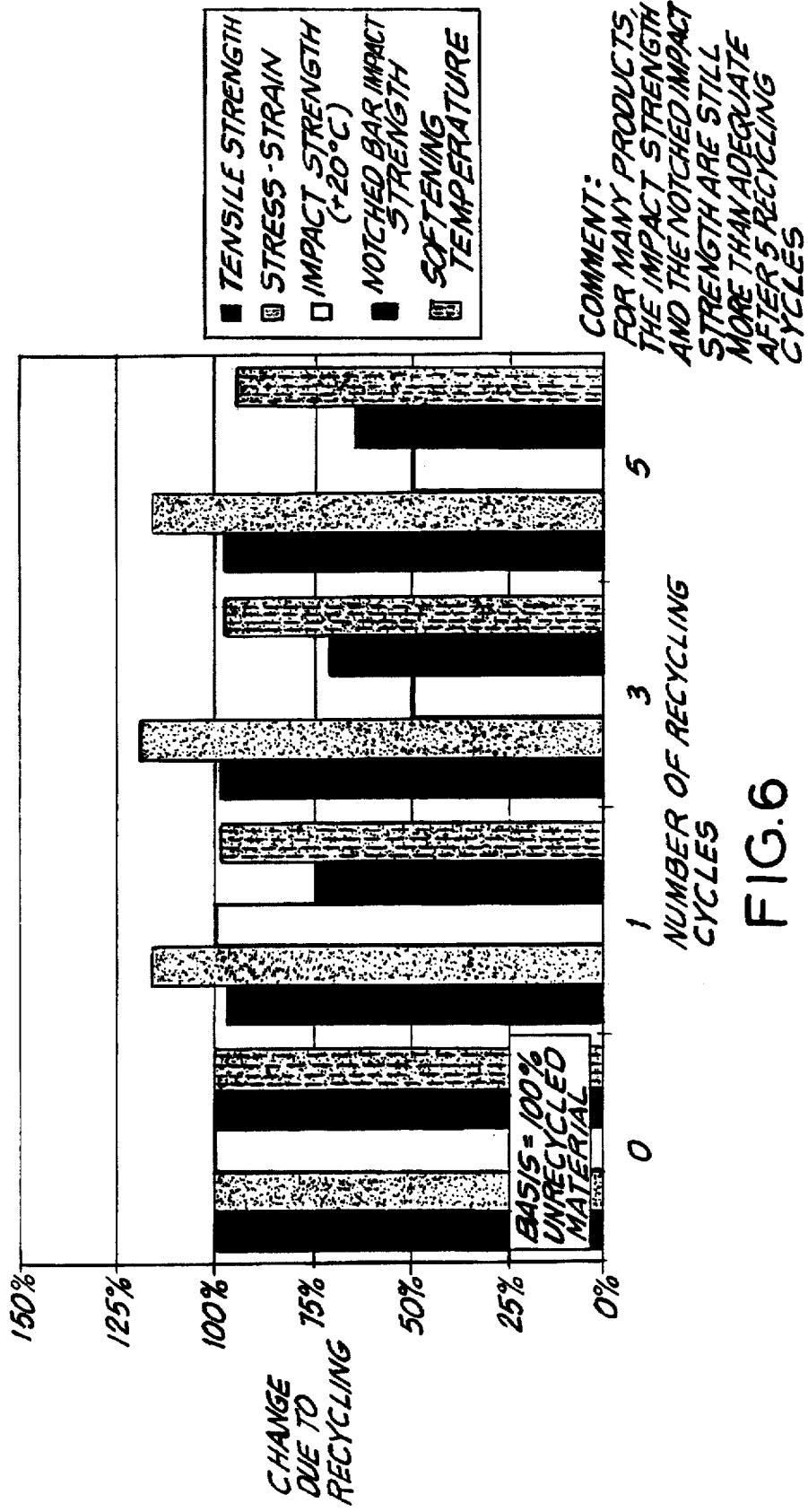

According to FIG. 6, the tensile strength of the material is retained practically completely after repeated recycling. The stress-strain increases. Only after the third recycling does the impact strength of the material fall to 50%. The notched impact strength also decreases with the number of recycling cycles. For many products however, both values are still completely adequate after five recyclings. The softening temperature decreases only slightly. The calorific value of the new materials remains unchanged, unaffected by the recycling cycles.

Figure 7:
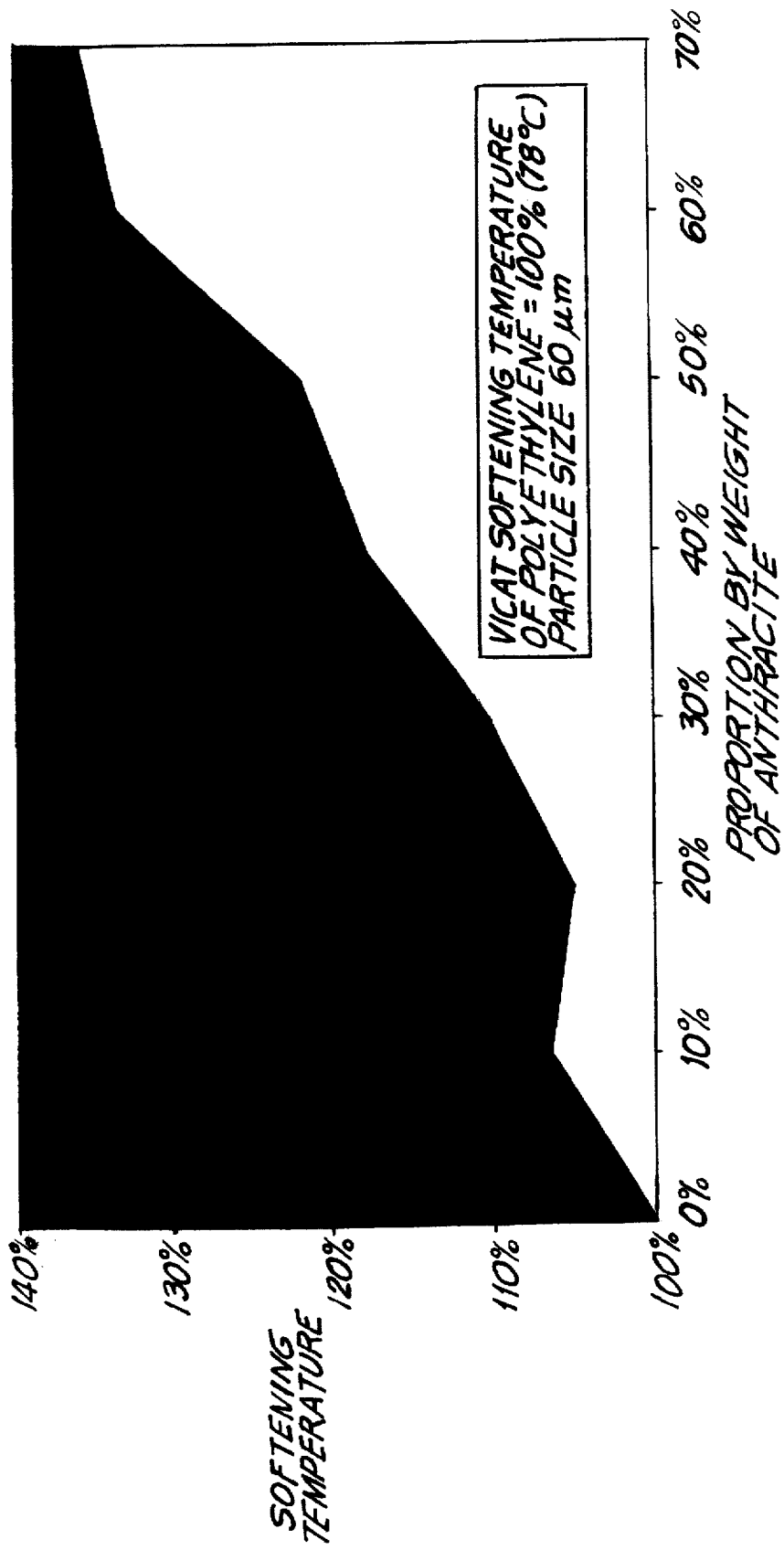

As shown by FIG. 7, the proportion by weight of anthracite also affects the softening temperature of the new materials. Starting from a softening temperature of 78° C. of the pure polyethylene, which is given a value of 100%, the softening temperature of the material with 70% by weight of anthracite having a particle size of 60 μm is at about 137% that is, about 170° C.

I claim:

1. A thermoplastic carbon-containing recyclable material without devaluating losses in quality and having a calorific value of more than 37,700 kJ/Kg which is processable with all plastic processing machines into molded articles, plates, panels, pipes, sheets and film, said material is produced by high-speed impact comminution in a closed and inert system of low-polluting and low-ash bituminous coal, bituminous coal coke or oil coke by means of a turbulent-flow disintegrator with little metal abrasion, and further mixing the carbon powder thus obtained, without any by further additives, with thermoplastic polymers of hydrocarbons to chemically bond carbon powder particles with the thermoplastic polymers by using energy which is released during the high-speed impact comminution.

2. The material of claim 1 comprising that, as very finely grained, prepared carbon powder, low ash and low sulfur anthracite, with approximately the following analytical values by weight is used:

| Carbon Content | >94% |
|---|---|
| Ash Content | <2% |
| Volatile Components | <2.5% |
| Sulfur Content | <1.5% |

3. The material of claim 1 or 2, comprising that the very finely grained carbon powders are disintegrated, depending on the intended use of the material, to particle sizes between 10 μm and 90 μm and constitute between 20 and 70% by weight of the material, 100% by weight of the difference comprising polymers.

4. The materials of claim 1 or 2, comprising thermoplastic polymers wherein the thermoplastic polymers are polyethylenes or polypropylenes.

5. The material of claim 1 or 2, comprising that the carbon powders are disintegrated with high impact speeds of up to 320 m/sec in a turbulent flow disintegrator with little metal abrasion.

6. The material of claim 1 or 2, comprising that it is prepared in an inert gas atmosphere or in an inert gas atmosphere containing up to 3% residual oxygen in a system, which is completely closed off from the outside atmosphere, and that, until it is processed further, it is stored in a gas-tight container out of contact with air.

7. The material of claim 1 or 2, comprising that the chemical bonding between the very finely grained, disintegrated carbon powders and the selected polymers takes place in an extruder by supplying thermal energy as working temperature between 200° C. and 300° C.

8. The material of claim 1 or 2, comprising that the supplied, very finely grained, disintegrated carbon powders and the selected polymers are brought together and processed under a working pressure of 200 N/mm².

9. The material of claim 1 or 2, comprising that the very finely grained, disintegrated carbon powder is heated to the working temperature before it is added to the extruder.

10. The material of claim 1 or 2, comprising that the added thermoplastic polymers contain only those material as additives, stabilizers, electrical conductors or pigments, which do not burden the flue gas with substances of toxic activity or with pollutants beyond the permissible measure, when the materials are burned.

11. The material of claim 1 or 2, comprising that it consists of 60% by weight of pulverized anthracite and 40% by weight of polyethylene.

* * * * *